United States Patent
Goo

(10) Patent No.: US 11,204,652 B2
(45) Date of Patent: Dec. 21, 2021

(54) APPARATUS AND METHOD FOR ARRANGING A KEYPAD IN WIRELESS TERMINAL

(71) Applicant: Samsung Electronics Co., Ltd., Suwon-si (KR)

(72) Inventor: Ja-Min Goo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/871,565

(22) Filed: May 11, 2020

(65) Prior Publication Data

US 2020/0272243 A1   Aug. 27, 2020

Related U.S. Application Data

(63) Continuation of application No. 16/503,071, filed on Jul. 3, 2019, now Pat. No. 10,649,543, which is a continuation of application No. 16/281,256, filed on Feb. 21, 2019, now Pat. No. 10,379,624, which is a continuation of application No. 16/152,854, filed on
(Continued)

(30) Foreign Application Priority Data

Nov. 25, 2011  (KR) .................... 10-2011-0123964

(51) Int. Cl.
*G06F 3/02* (2006.01)
*G06F 3/0488* (2013.01)

(52) U.S. Cl.
CPC ........ *G06F 3/0216* (2013.01); *G06F 3/04886* (2013.01)

(58) Field of Classification Search
CPC .... G06F 3/0216; G06F 3/04886; G06F 21/83; G06F 1/1666
See application file for complete search history.

(56) References Cited

U.S. PATENT DOCUMENTS

| 5,559,944 A | 9/1996 | Ono |
| 6,011,542 A | 1/2000 | Durrani et al. |

(Continued)

FOREIGN PATENT DOCUMENTS

| CN | 101159947 A | 4/2008 |
| CN | 101634932 A | 1/2010 |

(Continued)

OTHER PUBLICATIONS

New Firmware Upgrade for the Galaxy Note; http://mastmanban.tistory.com/698; Feb. 1, 2012; pp. 1-2.
(Continued)

*Primary Examiner* — Rodney Amadiz
(74) *Attorney, Agent, or Firm* — Jefferson IP Law, LLP

(57) ABSTRACT

An apparatus and method for arranging a keypad in a wireless terminal, and more particularly, to an apparatus and method for arranging a keypad in a wireless terminal to conveniently perform a key input in the wireless terminal, the apparatus including: a display unit for displaying the keypad in at least one of a right and left side on a screen of the display unit in a horizontal mode of the wireless terminal; and a controller for controlling the display unit to display the keypad in the right and/or left side on the screen of the display unit in the horizontal mode of the wireless terminal.

12 Claims, 3 Drawing Sheets

Related U.S. Application Data

Oct. 5, 2018, now abandoned, which is a continuation of application No. 13/669,582, filed on Nov. 6, 2012, now Pat. No. 10,146,325.

(56) References Cited

U.S. PATENT DOCUMENTS

| | | |
|---|---|---|
| 7,008,127 B1 | 3/2006 | Kurriss |
| 7,104,711 B2 | 9/2006 | Kurriss |
| 8,402,391 B1 | 3/2013 | Doray et al. |
| 8,525,792 B1 | 9/2013 | Lee et al. |
| 8,869,059 B2 | 10/2014 | Aono et al. |
| 2004/0183834 A1 | 9/2004 | Chermesino |
| 2004/0212605 A1 | 10/2004 | Fitzmaurice et al. |
| 2004/0212617 A1 | 10/2004 | Fitzmaurice et al. |
| 2005/0104848 A1 | 5/2005 | Yamaguchi et al. |
| 2005/0140661 A1 | 6/2005 | Collins |
| 2006/0007178 A1 | 1/2006 | Davis |
| 2006/0092180 A1* | 5/2006 | Hasegawa ............ G06F 3/04886 345/629 |
| 2007/0009303 A1 | 1/2007 | Kurriss |
| 2007/0073808 A1 | 3/2007 | Berrey et al. |
| 2007/0236460 A1 | 10/2007 | Young et al. |
| 2008/0119237 A1 | 5/2008 | Kim |
| 2008/0147812 A1 | 6/2008 | Curtis |
| 2009/0058815 A1 | 3/2009 | Jeon et al. |
| 2009/0109187 A1 | 4/2009 | Noma |
| 2009/0160792 A1 | 6/2009 | Morohoshi et al. |
| 2009/0167706 A1 | 7/2009 | Tan et al. |
| 2009/0198132 A1 | 8/2009 | Pelissier et al. |
| 2009/0273565 A1 | 11/2009 | Garside et al. |
| 2009/0282360 A1 | 11/2009 | Park et al. |
| 2009/0295743 A1 | 12/2009 | Nakajoh |
| 2009/0303200 A1 | 12/2009 | Grad |
| 2010/0001968 A1 | 1/2010 | Lee |
| 2010/0013780 A1 | 1/2010 | Ikeda et al. |
| 2010/0097321 A1 | 4/2010 | Son et al. |
| 2010/0134423 A1 | 6/2010 | Brisebois et al. |
| 2010/0182264 A1 | 7/2010 | Hahn et al. |
| 2010/0241985 A1 | 9/2010 | Kim et al. |
| 2010/0277414 A1 | 11/2010 | Tartz et al. |
| 2010/0317336 A1 | 12/2010 | Ferren et al. |
| 2011/0032202 A1 | 2/2011 | Aoyagi et al. |
| 2011/0090164 A1 | 4/2011 | Park et al. |
| 2011/0141027 A1 | 6/2011 | Ghassabian |
| 2011/0169737 A1 | 7/2011 | Ito |
| 2011/0187647 A1 | 8/2011 | Woloszynski et al. |
| 2011/0193782 A1 | 8/2011 | Shiu et al. |
| 2011/0202838 A1 | 8/2011 | Han et al. |
| 2011/0242138 A1 | 10/2011 | Tribble |
| 2011/0273540 A1 | 11/2011 | Lee et al. |
| 2011/0285555 A1 | 11/2011 | Bocirnea |
| 2011/0285631 A1 | 11/2011 | Imamura et al. |
| 2011/0316888 A1 | 12/2011 | Sachs et al. |
| 2012/0069231 A1 | 3/2012 | Chao |
| 2012/0075194 A1 | 3/2012 | Ferren |
| 2012/0084699 A1 | 4/2012 | Sirpal et al. |
| 2012/0113023 A1 | 5/2012 | Koch et al. |
| 2012/0113126 A1 | 5/2012 | Koch et al. |
| 2012/0117506 A1 | 5/2012 | Koch et al. |
| 2012/0127069 A1 | 5/2012 | Santhiveeran et al. |
| 2012/0146916 A1* | 6/2012 | Goong ............ G06F 3/04886 345/169 |
| 2012/0154301 A1 | 6/2012 | Kang et al. |
| 2012/0162078 A1 | 6/2012 | Ferren et al. |
| 2012/0206363 A1 | 8/2012 | Kyprianou et al. |
| 2012/0212418 A1 | 8/2012 | Shiota et al. |
| 2012/0274579 A1* | 11/2012 | Ikeda ............ G06F 3/0486 345/173 |
| 2012/0274585 A1 | 11/2012 | Telfer et al. |
| 2012/0324381 A1 | 12/2012 | Cohen et al. |
| 2012/0327106 A1 | 12/2012 | Won et al. |
| 2013/0002565 A1 | 1/2013 | Tumanov et al. |
| 2013/0019191 A1* | 1/2013 | Arnold ............ G06F 3/04886 715/765 |
| 2013/0057475 A1 | 3/2013 | Duggan et al. |
| 2013/0093680 A1 | 4/2013 | Ogita |
| 2013/0093682 A1 | 4/2013 | Lindsay |
| 2013/0111390 A1* | 5/2013 | Griffin ............ G06F 3/04886 715/773 |
| 2013/0120276 A1 | 5/2013 | Kim et al. |
| 2013/0234948 A1 | 9/2013 | Jian |
| 2013/0263039 A1 | 10/2013 | Fahlgren et al. |
| 2013/0300672 A1 | 11/2013 | Griffin |
| 2013/0307783 A1 | 11/2013 | Park et al. |
| 2013/0307801 A1 | 11/2013 | Nam |
| 2013/0321281 A1 | 12/2013 | Lambie |
| 2014/0028562 A1 | 1/2014 | St. Clair |
| 2014/0247222 A1 | 9/2014 | Ferren |
| 2015/0121262 A1 | 4/2015 | Yao |
| 2015/0148107 A1 | 5/2015 | Yamazaki |
| 2016/0077736 A1 | 3/2016 | Kim et al. |
| 2017/0185291 A1 | 6/2017 | Park et al. |

FOREIGN PATENT DOCUMENTS

| | | |
|---|---|---|
| CN | 101853136 A | 10/2010 |
| CN | 102043579 A | 5/2011 |
| CN | 102177485 A | 9/2011 |
| CN | 102375691 A | 3/2012 |
| CN | 102422246 A | 4/2012 |
| JP | 10-49305 A | 2/1998 |
| JP | 2002-354085 A | 12/2002 |
| JP | 2009-159600 A | 7/2009 |
| JP | 2012-3705 A | 1/2012 |
| KR | 10-2009-0024343 A | 3/2009 |
| KR | 10-2009-0063903 A | 6/2009 |
| KR | 10-2010-0003621 A | 1/2010 |
| KR | 10-2010-0003850 A | 1/2010 |
| KR | 10-2010-0042976 A | 4/2010 |
| KR | 10-2011-0051645 A | 5/2011 |
| KR | 10-1051068 B1 | 7/2011 |
| KR | 10-2011-0088486 A | 8/2011 |
| KR | 10-2011-0097373 A | 8/2011 |
| KR | 10-1078380 B1 | 10/2011 |
| KR | 10-2011-0120670 A | 11/2011 |
| KR | 10-1111566 B1 | 2/2012 |
| KR | 10-1175348 B1 | 8/2012 |
| KR | 10-1545569 B1 | 8/2015 |
| RU | 2008 145 805 A | 5/2008 |
| WO | 2005/076477 A1 | 8/2005 |

OTHER PUBLICATIONS

Update for Galaxy Note Drawback One-handed Operation Mode; http://smartdevice.kr/223; Feb. 20, 2012; pp. 6 and 8-10.

How to turn on and customise the on-screen keyboard in Windows XP; 3 pages; http:/fwww.bbc.eo.uk/accessibility/guides/keyboard_easier/onscreen/win/xp/index.shtml.

"Hands on with Thumb Keyboard for Android;" Pocketnow; https://www.youtube.com/watch?v=BIDeNHmJ858; Jun. 2, 2011.

"Thumb Keyboard—Quick Start Guide;" Cloctstone; http://www.beansoftapps.com/thumb-keyboard-quick-start-guide; Aug. 9, 2011.

"Thumb Keyboard;" Clockstone; http://www.beansoftapps.com/archives/products/thumb-keyboard; Jul. 22, 2011.

Chinese Examination Report dated Dec. 2, 2020, issued in Chinese Application No. 201810632698.7.

\* cited by examiner

FIG.3A

| | A | B | a | C | D |
|---|---|---|---|---|---|
| | 1 | 2 | | 3 | back space |
| | 4 | 5 | | 6 | enter |
| | 7 | 8 | ←——— | • 9 | Kor/Eng |
| | Symbol | 0 | | Space | Setting |

FIG.3B

| A | B | C | a | D |
|---|---|---|---|---|
| 1 | 2 | 3 | | back space |
| 4 | 5 | 6 •———→ | | enter |
| 7 | 8 • 9 ———→ | | | Kor/Eng |
| Symbol | 0 | Space | | Setting |

FIG.3C

| A | a | B | C | D |
|---|---|---|---|---|
| 1 | | 2 | 3 | back space |
| 4 | | 5 •→ 6 | | enter |
| 7 | | 8 | 9 | Kor/Eng |
| Symbol | | 0 | Space | Setting |

FIG.3D

| A | a | C | B | D |
|---|---|---|---|---|
| 1 | | 3 | 2 | back space |
| 4 | | 6 | 5 | enter |
| 7 | | 9 | 8 | Kor/Eng |
| Symbol | | Space | 0 | Setting |

APPARATUS AND METHOD FOR ARRANGING A KEYPAD IN WIRELESS TERMINAL

CROSS-REFERENCE TO RELATED APPLICATION(S)

This application is a continuation application of prior application Ser. No. 16/503,071, filed on Jul. 3, 2019, which issued as U.S. Pat. No. 10,649,543 on May 12, 2020; which is a continuation application of prior application Ser. No. 16/281,256, filed on Feb. 21, 2019, which issued as U.S. Pat. No. 10,379,624 on Aug. 13, 2019; which is a continuation of prior application Ser. No. 16/152,854, filed on Oct. 5, 2018, which was abandoned; which is a continuation application of prior application Ser. No. 13/669,582, filed on Nov. 6, 2012, which issued as U.S. Pat. No. 10,146,325 on Dec. 4, 2018; and which was based on and claimed priority under 35 U.S.C. § 119(a) to a Korean Patent Application filed in the Korean Intellectual Property Office on Nov. 25, 2011 and assigned Serial No. 10-2011-0123964, the entire contents of each of which are incorporated herein by reference.

BACKGROUND

Field

The present invention relates generally to an apparatus and method for arranging a keypad in a wireless terminal, and more particularly, to an apparatus and method for arranging a keypad in a wireless terminal to conveniently perform a key input in the wireless terminal.

Description of the Related Art

When an input mode is performed in a vertical mode (in which a wireless terminal is placed in a vertical direction), a keypad is displayed on the bottom of a screen of a display unit, and a key input in the input mode is performed on the displayed keypad.

Even when the input mode is performed in a horizontal mode (in which the wireless terminal is placed in a horizontal direction), a keypad is displayed on the bottom of the screen of the display unit, and a key input in the input mode is performed on the displayed keypad.

In the vertical mode of the wireless terminal, because the wireless terminal is placed in the vertical direction, a significant amount of screen area is available above the displayed keypad in order to display input contents together with the displayed keypad.

However, in the horizontal mode of the wireless terminal, because the wireless terminal is placed in the horizontal direction, the keypad in the horizontal mode occupies a relatively larger portion of the screen than when the keypad is in the vertical mode. Therefore, all of input contents may not be displayed on the screen. Additionally, it is inconvenient to use keys arranged in the center of the keypad in the horizontal mode.

SUMMARY

The present invention provides an apparatus and method for arranging a keypad in a wireless terminal so as to allow a user to conveniently perform a key input in the wireless terminal.

In accordance with one aspect of the present invention, an apparatus and method is provided for arranging a keypad in a wireless terminal to conveniently perform a key input while the wireless terminal is in a horizontal mode of operation.

In accordance with another aspect of the present invention, an apparatus and method is provided for arranging a keypad in a wireless terminal so as to allow display of all of input contents on a screen of a display unit in a horizontal mode of the wireless terminal.

According to one aspect of the present invention, there is provided an apparatus for arranging a keypad in a wireless terminal, including: a display unit for displaying the keypad in at least one of a right and left side on a screen of the display unit in a horizontal mode of the wireless terminal; and a controller for controlling the display unit to display the keypad in at least one of the right and left side on the screen of the display unit in the horizontal mode of the wireless terminal.

According to another aspect of the present invention, there is provided a method of arranging a keypad in a wireless terminal, including: switching to a horizontal mode of the wireless terminal; and displaying the keypad in at least one of a right and left side on a screen of a display unit in the horizontal mode of the wireless terminal.

When, in accordance with the invention, the keypad of the wireless terminal in the horizontal mode is displayed in at least one of the right and left side on the screen, a user may conveniently perform a key input, while at the same time a vertical area of the screen that is adjacent to the displayed keypad has no keypad display thereon. Thus, the full vertical area of the adjacent portion of the screen is available to display input contents thereon.

BRIEF DESCRIPTION OF THE DRAWINGS

The above and other features and advantages of the present invention will become more apparent from the following detailed description when taken in conjunction with the accompanying drawing in which:

FIGS. 3A, 3B, 3C, and 3D illustrate keypads of the wireless terminal, according to an embodiment of the present invention.

DETAILED DESCRIPTION

Preferred embodiments of the present invention will be described herein below with reference to the accompanying drawings. Like reference numbers are used to refer to like elements throughout the specification and the drawings. Detailed descriptions of functions and structures incorporated herein that are well known by those of ordinary skill in the art may be omitted for clarity and simplicity so as to not obscure appreciation of the present invention.

Figure 1:
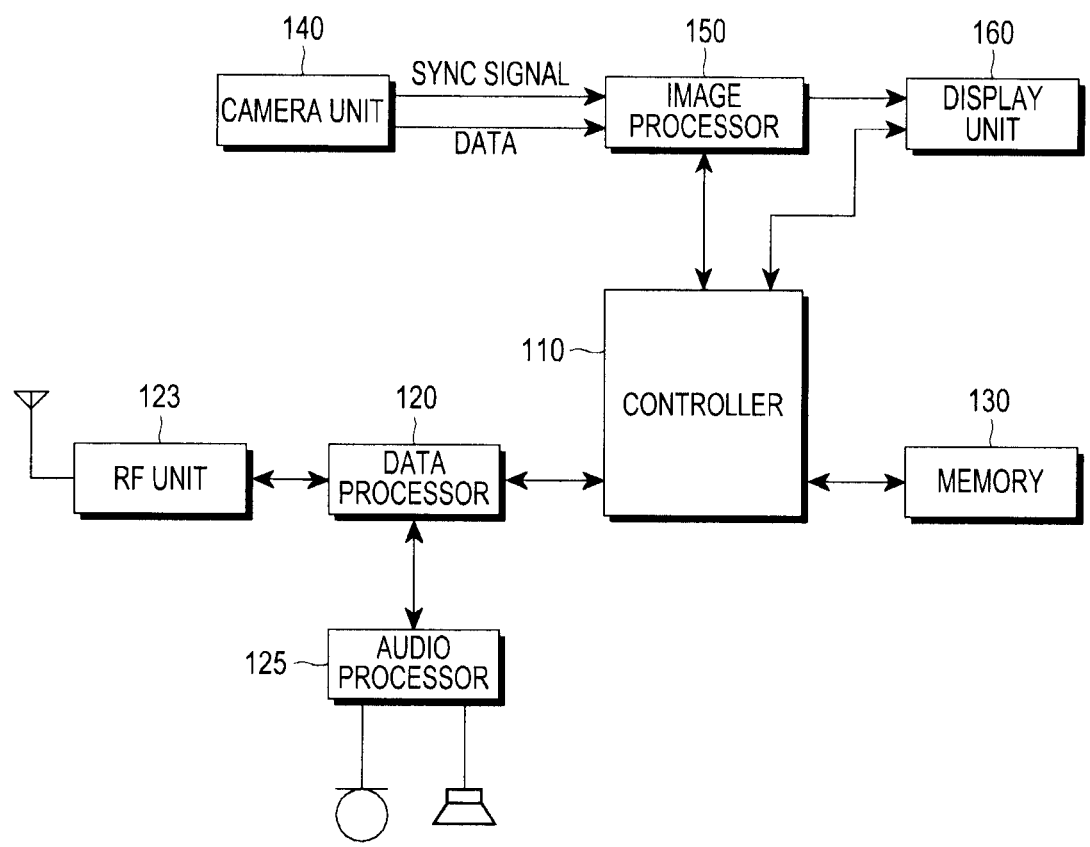
FIG. 1 is a block diagram illustrating a wireless terminal according to an embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the up-converted transmission signal and an RF receiver for low-noise amplifying a received signal and down-converting a frequency of the amplified received signal. A data processor 120 includes a transmitter for coding and modulating the transmission signal and a receiver for demodulating and decoding the received signal.

In other words, the data processor 120 may include a modem and a codec. The codec includes a data codec for processing packet data and the like, and an audio codec for processing an audio signal such as voice. An audio processor 125 plays a received audio signal output from the audio codec in the data processor 120 and transfers a transmission audio signal picked up by a microphone to the audio codec in the data processor 120.

A memory 130 may include a program memory and a data memory. The program memory may store programs for controlling a general operation of the wireless terminal. In addition, the program memory may store programs for controlling a display unit 160 to display a keypad in a right and/or left side on a screen in a horizontal mode of the wireless terminal. The data memory may temporarily store data generated while the programs are executed. In addition, when the horizontal mode of operation of the wireless terminal ends, according to an embodiment of the present invention (that is, when the display unit 160 is oriented in the horizontal direction), the memory 130 may store the keypad in the right and/or left side on the screen in the horizontal mode.

A controller 110 controls the overall operation of the wireless terminal.

According to an embodiment of the present invention, during the horizontal mode of the wireless terminal, the controller 110 controls the display unit 160 to display a keypad in the right and/or left side on the screen of the display unit 160.

In addition, when it is determined that the wireless terminal switches to an input mode in the horizontal mode, the controller 110 may control the display unit 160 to display a keypad in the right and/or left side on the screen of the display unit 160.

In addition, when the wireless terminal switches to the horizontal mode, the controller 110 may control the display unit 160 to display a keypad arranged in the right and/or left side on the screen of the display unit 160 in accordance with a previous horizontal mode.

When, as noted above, the wireless terminal is in the horizontal mode (that is, the screen is oriented in the horizontal direction) and the keypad is displayed in a right and/or left side on the screen, a user may conveniently perform a key input, while at the same time a vertical area of the screen that is adjacent to the displayed keypad has no keypad display thereon. Thus, the full vertical area of the adjacent portion of the screen is available to display input contents thereon.

In addition, in accordance with another aspect of the invention, a user is able to control details of how a keypad is arranged in the right and/or left side on the screen of the display unit 160, as described below.

More specifically, the controller 110 may control the display unit 160 to display a keypad divided and arranged on a row basis in the right and/or left side on the screen of the display unit 160 by moving row-based keys in accordance with a dragged direction through a hold-and-drag operation performed by a user of the wireless terminal.

In addition, when the hold-and-drag operation occurs for predetermined row-based keys of a keypad arranged in the left side on the screen of the display unit 160 in the horizontal mode of the wireless terminal, the controller 110 may control the display unit 160 to display the predetermined held row-based keys in the right side on the screen of the display unit 160 by moving the predetermined held row-based keys to the right (the dragged direction). In this case, the controller 110 may control the display unit 160 to display the predetermined held row-based keys in the right side on the screen of the display unit 160 when the drag operation in the right direction passes over the center line on the screen.

In addition, when the hold-and-drag operation occurs for predetermined row-based keys of a keypad arranged in the left side on the screen of the display unit 160 in the horizontal mode of the wireless terminal, the controller 110 may control the display unit 160 to display the predetermined held row-based keys at a changed position of the keypad arranged in the left side on the screen of the display unit 160 by moving the predetermined held row-based keys to the left (the dragged direction).

In addition, when the hold-and-drag operation occurs for predetermined row-based keys of a keypad arranged in the right side on the screen of the display unit 160 in the horizontal mode of the wireless terminal, the controller 110 may control the display unit 160 to display the predetermined held row-based keys in the left side on the screen of the display unit 160 by moving the predetermined held row-based keys to the left (the dragged direction). In this case, the controller 110 may control the display unit 160 to display the predetermined held row-based keys in the left side on the screen of the display unit 160 when the drag operation in the left direction passes over the center line on the screen.

In addition, when the hold-and-drag operation occurs for predetermined row-based keys of a keypad arranged in the right side on the screen of the display unit 160 in the horizontal mode of the wireless terminal, the controller 110 may control the display unit 160 to display the predetermined held row-based keys at a changed position of the keypad arranged in the right side on the screen of the display unit 160 by moving the predetermined held row-based keys to the right (the dragged direction).

A camera unit 140 includes a camera sensor for optically capturing image data and converting the optically captured image data into an electrical image signal, and a signal processor for converting the electrical image signal into digital data. The camera sensor is assumed herein to be a Charge-Coupled Device (CCD) or Complementary Metal Oxide Semiconductor (CMOS) sensor, and the signal processor may be realized by a Digital Signal Processor (DSP). The camera sensor and the signal processor may be realized in an integrated manner or in a separated manner.

An image processor 150 performs Image Signal Processing (ISP) for displaying image signals output from the camera unit 140 on the display unit 160, and the ISP performs functions such as gamma correction, interpolation, spatial variation, image effects, image scaling, Automatic White Balance (AWB), Automatic Exposure (AE), and Automatic Focusing (AF). The image processor 150 processes the image signals output from the camera unit 140 on a frame basis, and outputs the frame-based image data according to the characteristics and size of the display unit 160. The image processor 150, which includes a video codec, compresses frame image data displayed on the display unit 160 by preset coding, and restores (or decompresses) the compressed frame image data into its original frame image data. The video codec may include a JPEG codec, MPEG4 codec, Wavelet codec, etc. Assuming that the image processor 150 includes an On-Screen Display (OSD) function, the controller 110 may control the image processor 150 to output OSD data according to the size of a screen on which the data is displayed.

The display unit 160 displays an image output from the image processor 150 and user data output from the controller 110 on a screen. The display unit 160 may function as an input unit by being realized as a touch screen. In this case, the display unit 160 functioning as the input unit may display a keypad including the alphanumeric keys for inputting alphanumeric information and function keys for setting various functions.

In addition, according to an embodiment of the present invention, the display unit 160 may display a keypad in the right and/or left side on a screen in the horizontal mode of the wireless terminal, and the keypad may be divided on a row basis. In this case, keys arranged in row-based keypads of the keypad may be displayed the same as keys arranged in row-based keypads of a keypad displayed in a vertical mode of the wireless terminal.

Figure 2:
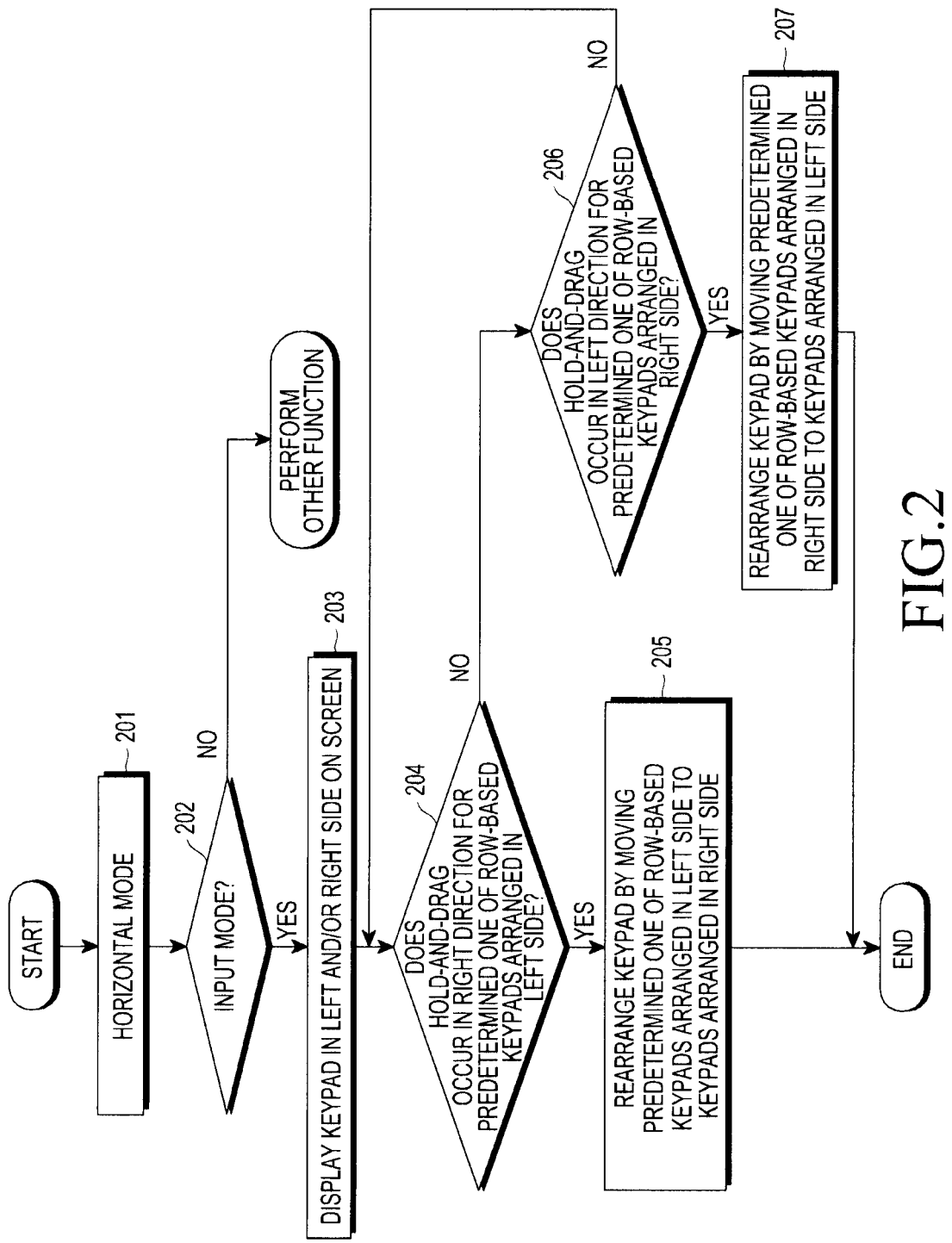
FIG. 2 is a flowchart illustrating a process of arranging a keypad in the wireless terminal, according to an embodiment of the present invention.

FIG. 2 is a flowchart illustrating a process of arranging a keypad in a wireless terminal, according to an embodiment of the present invention, and FIGS. 3A, 3B, 3C, and 3D illustrate keypads of the wireless terminal according to an embodiment of the present invention.

Referring to FIG. 2 (and with reference to FIG. 1 for details of the apparatus), in step 201, i.e., in the horizontal mode, in which the wireless terminal is placed in the horizontal direction, if the wireless terminal switches to the input mode for performing an input operation, the controller 110 detects this in step 202 and proceeds to step 203 to display a keypad in the left and/or right side on the screen of the display unit 160.

Alternatively, when it is determined in the input mode of the wireless terminal that the wireless terminal has been switched to the horizontal mode, the controller 110 may control the display unit 160 to display a keypad in the left and/or right side on the screen of the display unit 160 in step 203.

Alternatively, in step 203, the controller 110 may control the display unit 160 to display a keypad set as default or a keypad arranged in the left and/or right side on the screen of the display unit 160 in accordance with a previous horizontal mode.

Thus, when the wireless terminal switches to the horizontal mode, the controller 110 may control the display unit 160 to display a keypad in each of the left and right sides on the screen of the display unit 160, in only the left side on the screen of the display unit 160, or in only the right side on the screen of the display unit 160.

The keypad displayed in the left and/or right side on the screen of the display unit 160 may be divided on a row basis, and keys arranged in row-based keypads of the keypad may be displayed the same as keys arranged in row-based keypads of a keypad displayed in the vertical mode of the wireless terminal.

While the keypad is displayed in the left and/or right side on the screen of the display unit 160 in step 203, if a hold-and-drag operation occurs in the right direction for a predetermined one of row-based keypads arranged in the left side on the screen, the controller 110 detects this in step 204 and proceeds to step 205 to rearrange the keypad by moving the predetermined held row-based keypad to row-based keypads arranged in the right side on the screen of the display unit 160.

In this case, if the drag operation ends after the predetermined held row-based keypad passes over the center of the screen, the controller 110 controls the display unit 160 to rearrange the keypad by moving the predetermined held row-based keypad to the leftmost position of the row-based keypads arranged in the right side on the screen of the display unit 160.

If the drag operation ends when the predetermined held row-based keypad is placed at a predetermined one of the row-based keypads arranged in the right side on the screen, the controller 110 controls the display unit 160 to rearrange the keypad by moving the predetermined held row-based keypad to a position prior or next to the predetermined one of the row-based keypads arranged in the right side on the screen at which the drag operation ended.

Otherwise, while the keypad is displayed in the left and/or right side on the screen of the display unit 160 in step 203, if a hold-and-drag operation occurs in the left direction for a predetermined one of the row-based keypads arranged in the left side on the screen, the controller 110 detects this and controls the display unit 160 to rearrange the keypad by moving the predetermined held row-based keypad to the left so that a position of the predetermined held row-based keypad is changed in the row-based keypads arranged in the left side on the screen of the display unit 160.

In this case, if the drag operation ends when the predetermined held row-based keypad is placed at a predetermined one of the row-based keypads arranged in the left side on the screen, the controller 110 controls the display unit 160 to rearrange the keypad by moving the predetermined held row-based keypad to a position prior or next to the predetermined one of the row-based keypads arranged in the left side on the screen at which the drag operation ended.

Otherwise, while the keypad is displayed in the left and/or right side on the screen of the display unit 160 in step 203, if a hold-and-drag operation occurs in the left direction for a predetermined one of the row-based keypads arranged in the right side on the screen, the controller 110 detects this in step 206 and proceeds to step 207 to rearrange the keypad by moving the predetermined held row-based keypad to the row-based keypads arranged in the left side on the screen of the display unit 160.

In this case, if the drag operation ends after the predetermined held row-based keypad passes over the center of the screen, the controller 110 controls the display unit 160 to rearrange the keypad by moving the predetermined held row-based keypad to the rightmost position of the row-based keypads arranged in the left side on the screen of the display unit 160.

If the drag operation ends when the predetermined held row-based keypad is placed at a predetermined one of the row-based keypads arranged in the left side on the screen, the controller 110 controls the display unit 160 to rearrange the keypad by moving the predetermined held row-based keypad to a position prior or next to the predetermined one of the row-based keypads arranged in the left side on the screen at which the drag operation ends.

Otherwise, while the keypad is displayed in the left and/or right side on the screen of the display unit 160 in step 203, if a hold-and-drag operation occurs in the right direction for a predetermined one of the row-based keypads arranged in the right side on the screen, the controller 110 detects this and controls the display unit 160 to rearrange the keypad by moving the predetermined held row-based keypad to the right so that a position of the predetermined held row-based keypad is changed in the row-based keypads arranged in the right side on the screen of the display unit 160.

In this case, if the drag operation ends when the predetermined held row-based keypad is placed at a predetermined one of the row-based keypads arranged in the right side on the screen, the controller 110 controls the display unit 160 to rearrange the keypad by moving the predetermined held row-based keypad to a position prior or next to the predetermined one of the row-based keypads arranged in the right side on the screen at which the drag operation ends FIG. 3A illustrates row-based keypads A and B arranged in the left side on the screen of the display unit 160 and row-based keypads C and D arranged in the right side on the screen in the horizontal mode of the wireless terminal.

In FIG. 3A, when a hold-and-drag operation occurs in the left direction for a predetermined one (C) of the row-based keypads C and D arranged in the right side on the screen, if the drag operation in the left direction ends right after the predetermined held row-based keypad C passes over the center line a of the screen, the predetermined held one (C) of the row-based keypads C and D arranged in the right side on the screen is moved and rearranged to the rightmost position of the row-based keypads A and B arranged in the left side on the screen as shown in FIG. 3B.

In FIG. 3B, when a hold-and-drag operation occurs in the right direction for a predetermined one (C) of the row-based keypads A, B, and C arranged in the left side on the screen, if the drag operation in the right direction ends right after the predetermined held row-based keypad C passes over the center line a of the screen, and thereafter, when another hold-and-drag operation occurs in the right direction for a predetermined one (B) of the row-based keypads A and B arranged in the left side on the screen, if the drag operation in the right direction ends right after the predetermined held row-based keypad B passes over the center line a of the screen, the predetermined held ones (C and B) of the row-based keypads A, B, and C arranged in the left side on the screen are moved and rearranged in the moved order to the leftmost position of the row-based keypad D arranged in the right side on the screen as shown in FIG. 3C.

In FIG. 3C, when a hold-and-drag operation occurs in the right direction for a predetermined one (B) of the row-based keypads B, C, and D arranged in the right side on the screen, if the drag operation ends when the predetermined held row-based keypad B is placed at a predetermined one (C) of the row-based keypads B, C, and D arranged in the right side on the screen, the predetermined held one (B) of the row-based keypads B, C, and D arranged in the right side on the screen is moved and rearranged to a position next to the predetermined one (C) at which the drag operation ends as shown in FIG. 3D.

As described above, when an input operation is performed by using a keypad arranged in the left and/or right side on a screen of a display unit in the horizontal mode of a wireless terminal, all of input contents may be perceived on the screen as in the vertical mode of the wireless terminal.

In addition, although only movement of row-based keypads of a keypad has been described in the embodiments of the present invention, movement of column-based keypads of the keypad may also be likely performed through a hold-and-drag operation.

In addition, although only row-based movement of a keypad has been described in the embodiments of the present invention, a character/number assigned to each key of the keypad may also be moved and rearranged to a desired key position of the keypad through a hold-and-drag operation.

As is apparent from the foregoing description, the proposed apparatus and method for arranging a keypad in a wireless terminal, in which a keypad is displayed in a right and/or left side on a screen of a display unit in the horizontal mode of the wireless terminal, allows a user to conveniently perform a key input in the horizontal mode of the wireless terminal, while at the same time leaving a vertical area of the screen that is adjacent to the displayed keypad, which vertical area has no keypad display thereon, so that the full vertical area of the screen is available to display input contents thereon.

While the invention has been shown and described with reference to certain exemplary embodiments, such as a wireless terminal, thereof, it will be understood by those skilled in the art that various changes in form and details may be made therein without departing from the spirit and scope of the invention as defined by the appended claims and their equivalents.

What is claimed is:
1. An electronic device comprising:
a touch screen display; and
a controller configured to:
control the touch screen display to display a keypad including a plurality of keys in a state in which the keypad is split into a first part and a second part, wherein no keys are displayed in an area between the first part and the second part, the first part including one or more first columns, the second part including one or more second columns, each of one or more first columns and each of one or more second columns including two or more keys arranged in a same line,
receive a user input on a first key of the first part, the user input including a drag input dragging the first key into a designated portion of the area, and
based on receiving the user input, relocate a column including the first key among the one or more first columns from a first position to a second position on the touch screen display,
wherein positions of all remaining keys other than keys included in the column including the first key among the plurality of keys are maintained, before and after the column including the first key is relocated.

2. The electronic device of claim 1, wherein the controller is configured to relocate, based on receiving the user input, the column including the first key from a left side of the touch screen display to a right side of the touch screen display or from the right side to the left side.

3. The electronic device of claim 2, wherein the same line includes a same column.

4. The electronic device of claim 1, wherein the first part is arranged in a left side, and the second part is arranged in a right side.

5. The electronic device of claim 4, wherein the controller is configured to relocate, based on receiving the user input, the column including the first key arranged at a rightmost position in the first part to a position adjacent to a leftmost position in the second part.

6. The electronic device of claim 4, wherein the controller is configured to relocate, based on receiving the user input, the column including the first key arranged at a leftmost position in the second part to a position adjacent to a rightmost position in the first part.

7. A method of arranging a keypad in an electronic device, the method comprising:
displaying the keypad including a plurality of keys on a touch screen display of the electronic device in a state in which the keypad is split into a first part and a second part, wherein no keys are displayed in an area between the first part and the second part, the first part including one or more first columns, the second part including one or more second columns, each of one or more first columns and each of one or more second columns including two or more keys arranged in a same line;

receiving a user input on a first key of the first part, the user input including a drag input dragging the first key into a designated portion of the area; and based on receiving the user input, relocating a column including the first key among the one or more first columns from a first position to a second position on the touch screen display, wherein positions of all remaining keys other than keys included in the column including the first key among the plurality of keys are maintained, before and after the column including the first key is relocated.

8. The method of claim 7, wherein relocating the first key and the one or more keys comprises relocating, based on receiving the user input, the column including the first key from a left side of the touch screen display to a right side of the touch screen display or from the right side to the left side.

9. The method of claim 8, wherein the same line includes a same column.

10. The method of claim 7, wherein the first part is arranged in a left side, and the second part is arranged in a right side.

11. The method of claim 10, wherein relocating the first key and the one or more keys comprises, relocating based on receiving the user input, the column including the first key arranged at a rightmost position in the first part to a position adjacent to a leftmost position in the second part.

12. The method of claim 10, wherein relocating the first key and the one or more keys comprises relocating, based on receiving the user input, the column including the first key arranged at a leftmost position in the second part to a position adjacent to a rightmost position in the first part.

* * * * *